(12) United States Patent
Ueda

(10) Patent No.: US 7,543,260 B2
(45) Date of Patent: Jun. 2, 2009

(54) DESIGN SUPPORTING SYSTEM OF SEMICONDUCTOR INTEGRATED CIRCUIT, METHOD OF DESIGNING SEMICONDUCTOR INTEGRATED CIRCUIT, AND COMPUTER READABLE MEDIUM FOR SUPPORTING DESIGN OF SEMICONDUCTOR INTEGRATED CIRCUIT

(75) Inventor: Toshiaki Ueda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 444 days.

(21) Appl. No.: 11/476,181

(22) Filed: Jun. 28, 2006

(65) Prior Publication Data

US 2007/0101307 A1 May 3, 2007

(30) Foreign Application Priority Data

Jun. 28, 2005 (JP) ............................ 2005-188379

(51) Int. Cl.
*G06F 17/50* (2006.01)
(52) U.S. Cl. ............................................ 716/10; 716/5
(58) Field of Classification Search ..................... 716/1, 716/2, 5, 10
See application file for complete search history.

(56) References Cited

U.S. PATENT DOCUMENTS

| 5,391,885 | A  | * | 2/1995  | Imataki et al. ........... 250/492.2 |
| 5,638,292 | A  |   | 6/1997  | Ueda |
| 5,754,432 | A  | * | 5/1998  | Komatsuzaki et al. ....... 700/110 |
| 6,687,633 | B2 | * | 2/2004  | Ono et al. ...................... 702/83 |
| 6,775,817 | B2 | * | 8/2004  | Ono et al. ...................... 716/21 |
| 6,799,130 | B2 | * | 9/2004  | Okabe et al. .................. 702/82 |
| 6,826,735 | B2 | * | 11/2004 | Ono et al. ...................... 716/4 |
| 6,918,101 | B1 | * | 7/2005  | Satya et al. .................... 716/5 |
| 2005/0010890 | A1 | * | 1/2005 | Nehmadi et al. .............. 716/19 |

FOREIGN PATENT DOCUMENTS

| JP | 07-182381   | 7/1995 |
| JP | 11-039357   | 2/1999 |
| JP | 11-265940   | 9/1999 |
| JP | 2001-230323 | 8/2001 |

* cited by examiner

*Primary Examiner*—Sun J Lin
(74) *Attorney, Agent, or Firm*—Oblon, Spivak, McClelland, Maier & Neustadt, P.C.

(57) ABSTRACT

A design supporting system of a semiconductor integrated circuit includes a unit that converts a defective circuit pattern into computer detectable information when a layout of the chip is determined, and corrects the defective circuit pattern of layout of the chip based on the computer detectable information.

12 Claims, 14 Drawing Sheets

DESIGN SUPPORTING SYSTEM OF SEMICONDUCTOR INTEGRATED CIRCUIT, METHOD OF DESIGNING SEMICONDUCTOR INTEGRATED CIRCUIT, AND COMPUTER READABLE MEDIUM FOR SUPPORTING DESIGN OF SEMICONDUCTOR INTEGRATED CIRCUIT

CROSS-REFERENCE TO RELATED APPLICATIONS

This application is based on and claims the benefit of priority from the prior Japanese Patent Application No. 2005-188379, filed on Jun. 28, 2005; the entire contents of which are incorporated herein by reference.

TECHNICAL FIELD

The present invention relates to a design supporting system of a semiconductor integrated circuit, a method of designing a semiconductor integrated circuit, a computer readable medium for supporting design of a semiconductor integrated circuit.

BACKGROUND

In the design of the semiconductor integrated circuit, the pattern layout on the chip area is decided by placing cells or blocks having the logic function or the storing function in the chip and providing the wirings between the input/output terminals to get desired circuit operations. The semiconductor integrated circuit according to the common gate array system is constructed by areas where the cells are placed, areas where the wirings are provided between the cells and the peripheral area where input/output circuits are placed. A plurality of wiring layers are utilized as the wirings on the chip. The wiring layers are allocated to extend in the horizontal/vertical directions in respective layers. The computer optimizes automatically the placement of the cells and the wirings between the terminals and decides the layout pattern on the overall surface of the chip area.

The verifying/correcting process of the layout pattern is executed after the layout pattern is decided. For example, the layout verification is applied to respective patterns such as the cells, the wirings, the vias, and the like placed on the chip area by using softwares such as design rule check (DRC), layout vs schematic (LVS), and the like. Then, the pattern adjusting process such as the optical correction, or the like is executed by using mask data preparation (MDP), optical proximity correction (OPC), and the like.

A dimensional distortion of the layout pattern has a negative effect of a circuit characteristic. Considering the dimensional distortion, a delay computing method in consideration of relationships the process fluctuation of the device and the circuit characteristic is known (see JP-A-11-39357, for example). The logic simulation method to execute the delay analysis in consideration of the mutual delay variation between the signals is known (see JP-A-7-182381, for example). As the method to take the distortion between the design pattern and the pattern manufactured on the wafer into account, the technology to analyze the circuit by preparing correlation data of differences between mask layout widths and finished widths of the wirings and calculating wiring resistance values and wiring capacitance values such that the high-precision wiring finished width can be calculated and the high-precision circuit simulation can be executed is known (see JP-A2001-230323, for example).

However, with the progress of the miniaturization of the dimension of the transistors and the wirings manufactured on the wafer, it becomes difficult to realize the exact layout shape in conformity with the mask pattern. The design pattern that is hard to apply the lithography process not only affects largely the variation in the electrical characteristics of the fine process device structure and the performance/reliability of the semiconductor integrated circuit but also causes short circuit of the wiring, disconnection, etc. to deteriorate the yield. Also, since the distortion is caused between the layout figure intended by the design step and the geometrical figure exposed on the wafer due to the influence of the optical proximity correction, the OPC process applied to correct the distortion becomes complicated. Also, a rapid increase in an amount of data of the in-mask figure representation subsequent to the layout design is caused, and a mask cost is increased. In addition, because the patterns that cannot be handled by the OPC process are generated, the design patterns whose pattern verification/correction steps have been completed must be fed back to the layout design step once again and then such design patterns must be corrected once again in the layout design step.

However, a large feedback loop from the design to the manufacture is generated if the defective patterns found by the lithography verification, or the like is corrected by feeding back such patterns to the layout design. Therefore, a design term is prolonged.

SUMMARY

According to an aspect of the present invention, there is provided a design supporting system of a semiconductor integrated circuit including a unit that converts a defective circuit pattern into computer detectable information when a layout of the chip is determined, and corrects the defective circuit pattern of layout of the chip based on the computer detectable information.

According to another aspect of the present invention, there is provided a method of manufacturing semiconductor integrated circuit including: converting a defective circuit pattern into computer detectable information when a layout of the chip is determined; and correcting the defective circuit pattern of layout of the chip based on the computer detectable information.

According to another aspect of the invention, there is provide a storage medium readable by a computer, the storage medium storing a program of instructions executable by the computer to perform a function for supporting a design of a semiconductor integrated circuit, the function, including: storing in a data storing equipment information of a defective circuit pattern that is hard to apply a lithography process; defining a plurality of areas in a chip; deciding a layout of the chip by automatically placing/routing cells, wirings, and vias every area; reading the information of the defective circuit pattern; verifying the information of the defective circuit pattern and a decided result of the layout of the chip; calculating an occurring frequency of the defective circuit pattern in each area of the plurality of areas; analyzing a manufacturability of the layout based on the calculated occurring frequency; and extracting selectively an area where the occurring frequency of the defective circuit pattern is in excess of a predetermined value; and correcting a placement of cells, wirings, and vias in the area.

BRIEF DESCRIPTION OF THE DRAWINGS

These and other objects and advantages of this invention will become more fully apparent from the following detailed description taken with the accompanying drawings in which.

DESCRIPTION OF THE EMBODIMENTS

Figure 1:
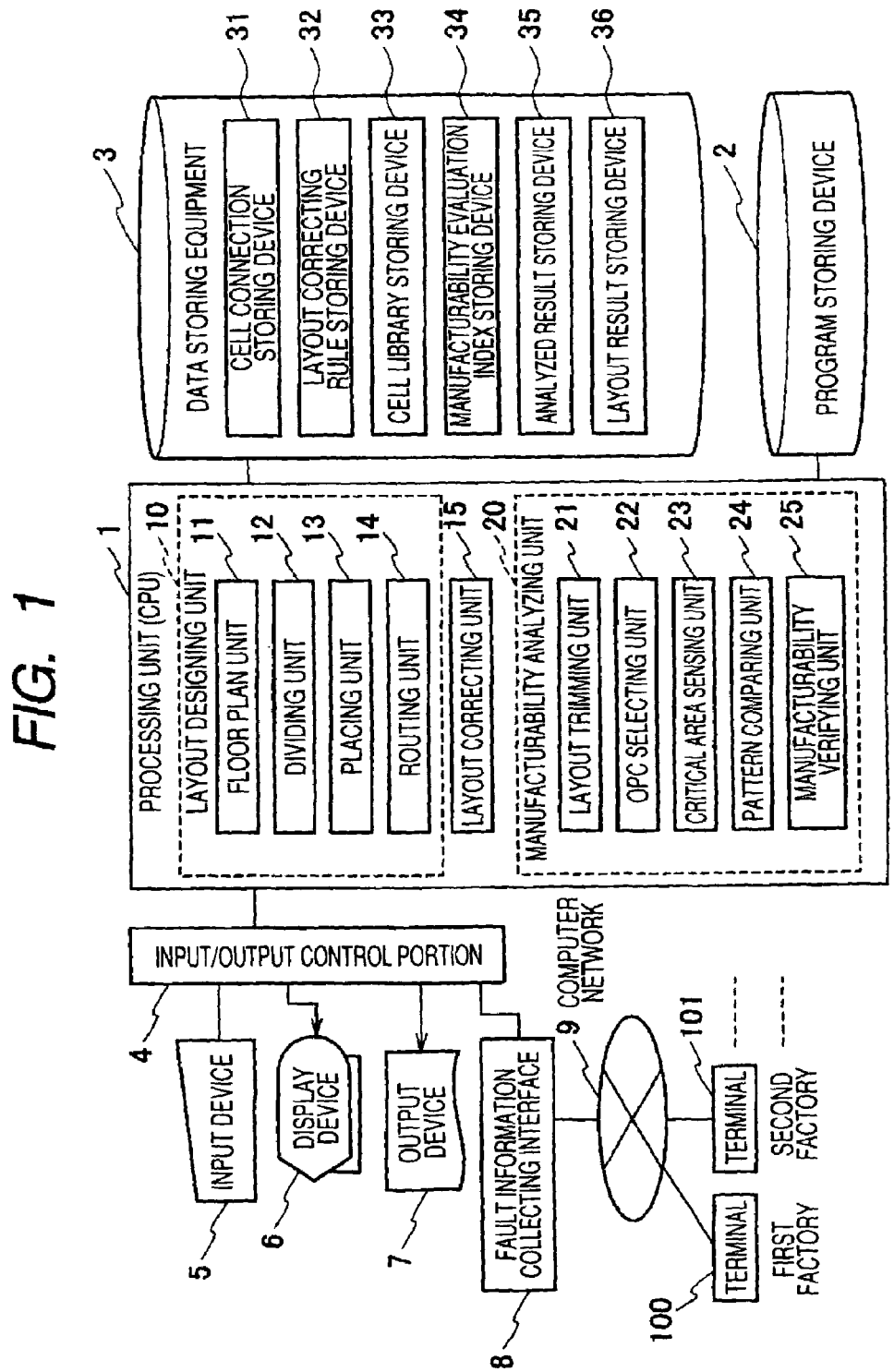
FIG. 1 is a block diagram showing an example of a design supporting system according to an embodiment of the present invention.

Embodiments of the present invention will be explained with reference to the drawings hereinafter. In the descriptions in following Figures, the same or like reference numerals are affixed to the same or like portions. In this case, it should be noted that drawings are schematically made and thus relationships between thicknesses and planar dimensions, thickness ratios between respective layers, and the like are different from actual portions. Therefore, particular thicknesses and dimensions should be decided in consideration of following explanations. Also, it is a matter of course that the portions having different dimensional relationships or ratios mutually are contained mutually in the drawings. Also, the embodiments given in the following merely show devices and methods applied to embody the technical ideas of this invention, and the technical ideas of this invention should not be interpreted to limit material, shape, structure, arrangement, etc. of the constituent parts to the followings. Various variations can be applied to the technical ideas of this invention within claims.

As shown in FIG. 1, a design supporting system includes data storing equipment 3, a layout designing unit 10, a manufacturability analyzing unit 20, and a layout correcting unit 15. The data storing equipment 3 stores information of defective patterns that are gathered via a computer network 9 and are hard to apply the lithography process. The layout designing unit 10 decides a layout of a chip by defining a plurality of areas in the chip and automatically placing/routing wirings and vias. The manufacturability analyzing unit 20 reads the information of the defective patterns, calculates an occurring frequency of the defective pattern every area, and analyzes a manufacturability of the layout based on the occurring frequency. The layout correcting unit 15 extracts selectively the areas where the occurring frequency exceeds a predetermined value, and corrects placements of cells, wirings, and vias in the areas. Herein, the occurring frequency of the defective pattern unit any representation of the frequency which the defective pattern happens, such as a rate or a ratio.

The layout designing unit 10, the layout correcting unit 15, and the manufacturability analyzing unit 20 can be constructed as a part of a processing unit (CPU) 1 of the computer system, as shown in FIG. 1. An input device 5 for accepting an input, etc. from the operator, a display device 6 and an output device 7 for displaying processed results of the CPU 1, layout results of the chip, etc., a fault information collecting interface 8 connected to the computer network 9, and a program storing device 2 for storing various programs in the arithmetic process, etc. are connected to the CPU 1. Terminals 100, 101, . . . of a first factory, a second factory, . . . , are connected to the computer network 9. Fault information of respective factories are gathered from the terminals 100, 101, . . . via the computer network 9 and the fault information collecting interface 8 and then stored in the data storing equipment 3.

The layout designing unit 10 has a floor plan unit 11, a dividing unit 12, a placing unit 13, and a routing unit 14. The floor plan unit 11 reads net list, timing constraint, chip shape of the manufactured semiconductor integrated circuit, position information of input/output terminals, design constraint information regarding cell shapes and arrangements, layout manufacturability evaluation index, etc. stored in the data storing equipment 3, and then formulates a floor plan of the chip. The dividing unit 12 divides virtually an inside of the chip into a plurality of areas like the lattice. The placing unit 13 automatically places logic cells, macrocells, input/output cells, etc. every plural areas divided virtually by the dividing unit 12, based on the information of the floor plan decided by the floor plan unit 11. The routing unit 14 provides wirings between the cells based on the placement result of the cells.

Figure 2:
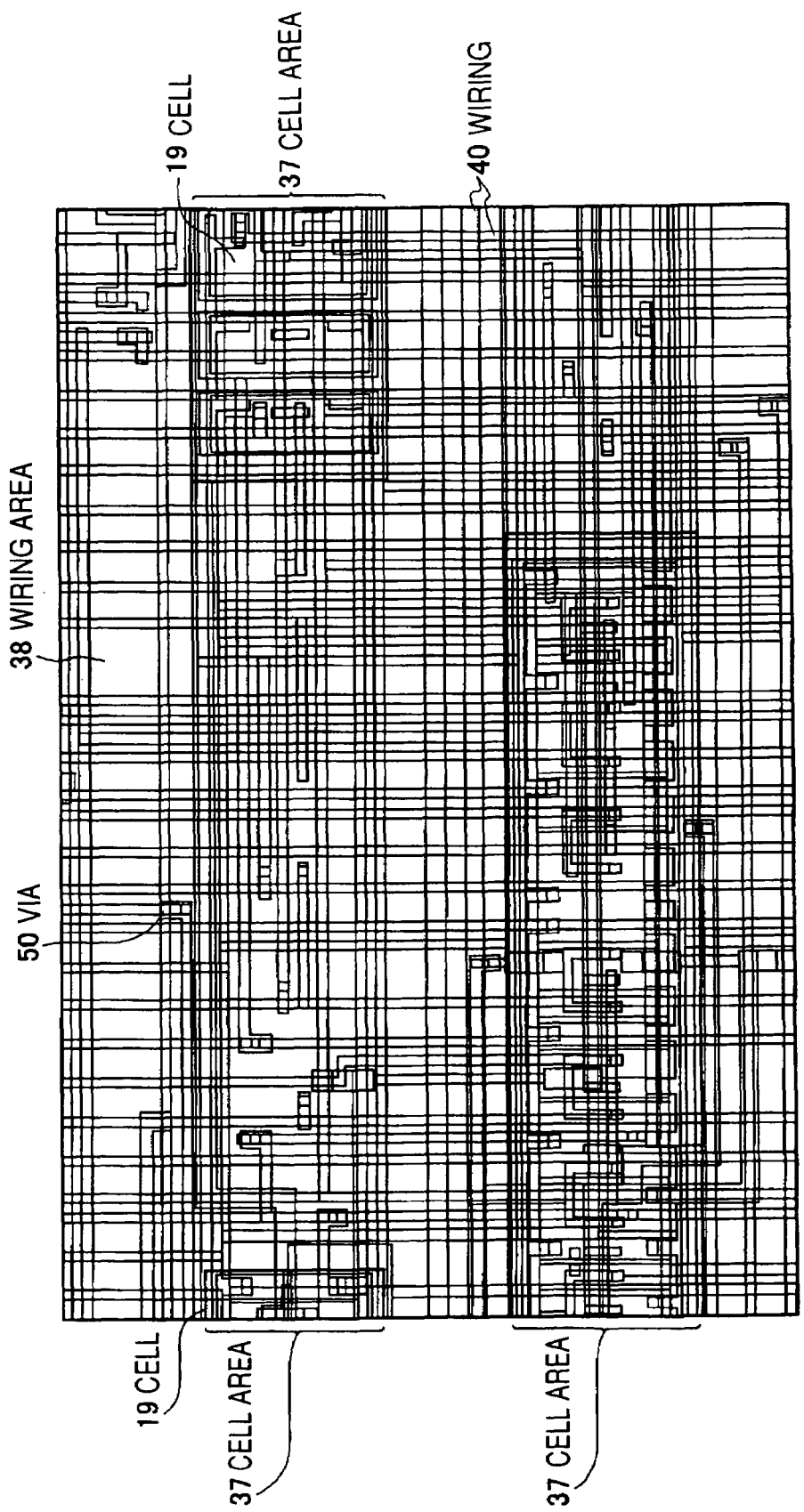
FIG. 2 is a view showing an example of a layout result of a semiconductor integrated circuit according to the embodiment.

FIG. 2 shows an example of image information when manufacturing GDS layout data decided by the layout designing unit 10 are displayed on the display device 6. Cell areas 37 in which a plurality of cells 19 are placed and wiring areas 38 in which a plurality of cells 19 placed in the cell areas 37 are connected via wirings are formed on the layout in FIG. 2. A peripheral circuit in which input/output terminals, etc. (not shown) are placed is formed around the chip on which the cell areas 37 and the wiring areas 38 are formed. Plural layers of wirings 40 each of which extends in the horizontal direction and the vertical direction respectively every layer are laid in the wiring areas 38. Plural vias 50 are place on the crossing portions of plural wirings 40.

The manufacturability analyzing unit 20 senses the defective pattern from image information shown in FIG. 2 every plural areas divided by the dividing unit 12, and analyzes the manufacturability of the semiconductor integrated circuit based on the occurring frequency of the defective pattern. Therefore, the manufacturability analyzing unit 20 has a layout trimming unit 21, an OPC selecting unit 22, a critical area sensing unit 23, a pattern comparing unit 24, and a manufacturability verifying unit 25.

The layout trimming unit 21 converts layout data that the layout designing unit 10 decided, image information of the defective patterns gathered by the fault information collecting interface 8, or the like into topology information of skeletons (frames). The topology information include information about lengths, widths, shapes, and the like of the patterns such as wirings, vias, cells, and the like in the layout, connectivity lists between respective patterns, etc. The OPC selecting unit 22 selects types of the OPC pattern shapes regarding specific patterns in the layout, positions of the processes objects, etc. and then senses problem locations in the OPC as the defective pattern by applying the OPC process to them. The critical area sensing unit 23 senses areas, in which short, open, shortening, or the like of the wirings or the vias has estimated to occur, of the layout as the defective pattern.

Figure 3:
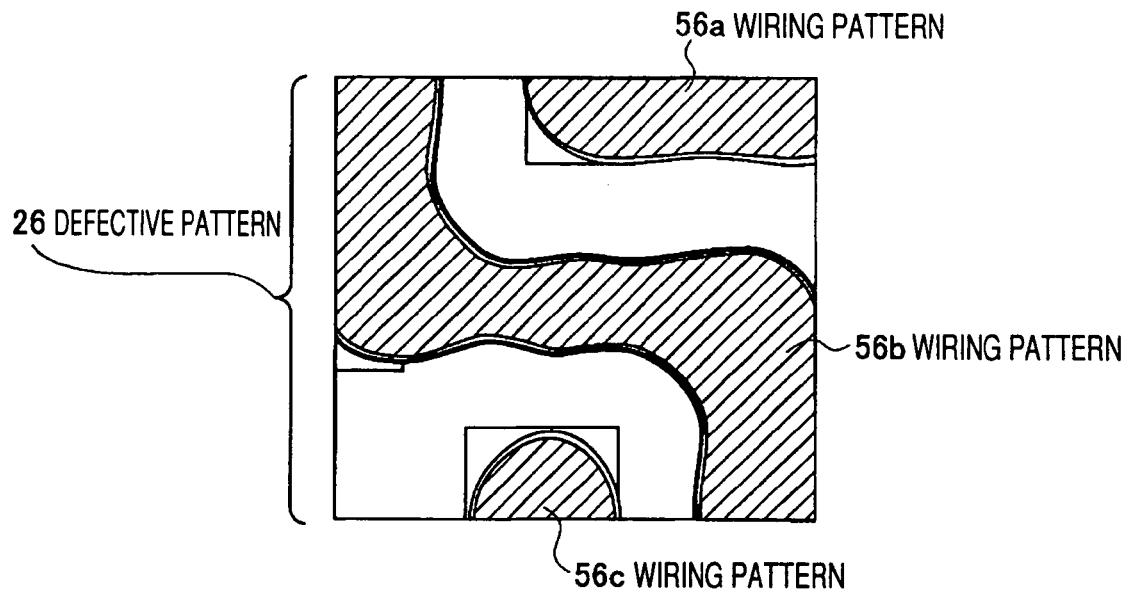
FIG. 3 is a view showing an example of a defective pattern found in a method of designing the semiconductor integrated circuit according to the embodiment.
Figure 4:
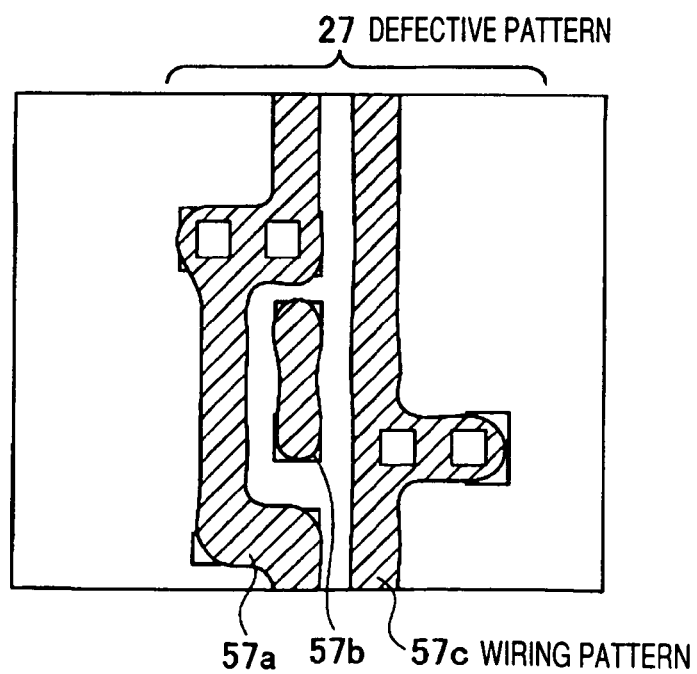
FIG. 4 is a view showing another example of the defective pattern found in the method of designing the semiconductor integrated circuit according to the embodiment.

FIG. 3 and FIG. 4 show an image view of defective patterns 26, 27, which are gathered by the fault information collecting interface 8 from the terminals 100, 101 in respective factories and stored in the data storing equipment 3, on the wafer. The defective pattern 26 contains wiring patterns 56a, 56b, 56c. The defective pattern 27 contains wiring patterns 57a, 57b, 57c. Both the defective patterns 26, 27 shown in FIG. 3 and FIG. 4 can satisfy a design rule, nevertheless these patterns 26, 27 act as a factor to lower the yield since they are severe in their margin for the process fluctuation upon manufacturing the semiconductor integrated circuit. Therefore, when a large number of defective patterns 26, 27 are present in the layout decided by the layout designing unit 10, the yield of the semiconductor integrated circuit is deteriorated.

The pattern comparing unit 24 in FIG. 1 reads the information gathered by the fault information collecting interface 8 from the terminals 100, 101, . . . , in respective factories, i.e., the topology information of the defective patterns 26, 27 shown in FIG. 3 and FIG. 4. The pattern comparing unit 24 compares the layout information of the chip, which is decided by the layout designing unit 10 and shown in FIG. 2, for example, with the topology information of the defective patterns 26, 27, and senses the defective patterns 26, 27 existing in the layout. The operator can sense the defective patterns 26, 27 via the input device 5.

The manufacturability verifying unit 25 calculates the occurring frequency of the defective patterns sensed by the pattern comparing unit 24, or the like every area on the chip that is divided into a plurality of areas. The manufacturability verifying unit 25 verifies the manufacturability of each area by reading a predetermined value stored in the data storing equipment 3 and then deciding whether or not the occurring frequency of the defective patterns in each area is in excess of the predetermined value.

Figure 5:
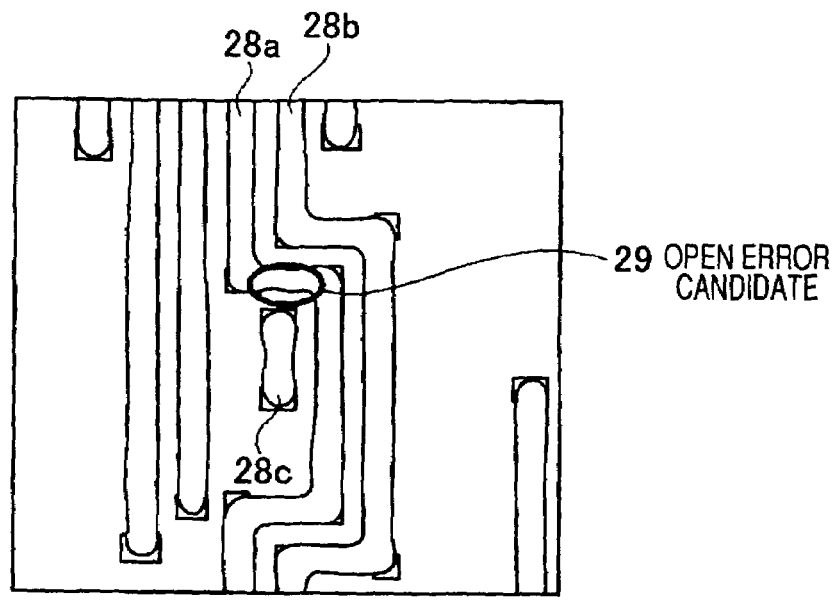
FIG. 5 is a view showing another example of the layout result of the semiconductor integrated circuit according to the embodiment.
Figure 6:
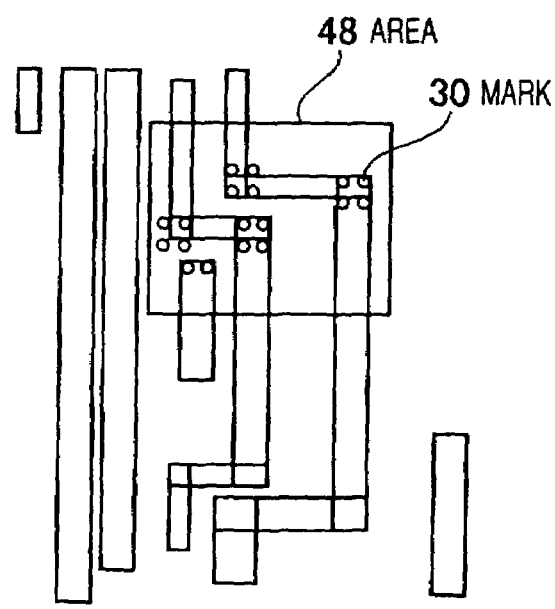
FIG. 6 is a view showing still another example of the layout result of the semiconductor integrated circuit according to the embodiment, wherein an example of the case where information in FIG. 5 are converted into polygonal pattern information is shown.

FIG. 5 shows an example of image information of the manufacturing GDS layout data decided by the layout designing unit 10, and the like. FIG. 5 shows an open error candidate 29. Since wiring patterns 28a, 28b, 28c are placed adjacently respectively, a part of wiring pattern 28a constitutes the open fault in this open error candidate 29 when the wiring pattern 28a is transferred onto the wafer. FIG. 6 shows an example of the case where image information shown in FIG. 5 are converted into information of a polygonal pattern (polygon) shown in FIG. 6. The manufacturability verifying unit 25 puts a mark 30 onto tip ends of the polygon every area 48 that is divided by the dividing unit 12, and then decides the manufacturability by comparing the number of marks 30 with the information of the previously registered decision index. More concretely, suppose that, for example, ten marks 30 each acting as the decision index of the manufacturability are set in one area. In contrast, since the area 48 contains eighteen marks 30 and the number of the marks exceeds the predetermined value (ten marks 30), the manufacturability verifying unit 25 decides the area 48 as the area where the occurring frequency of the defective pattern is high.

Figure 7:
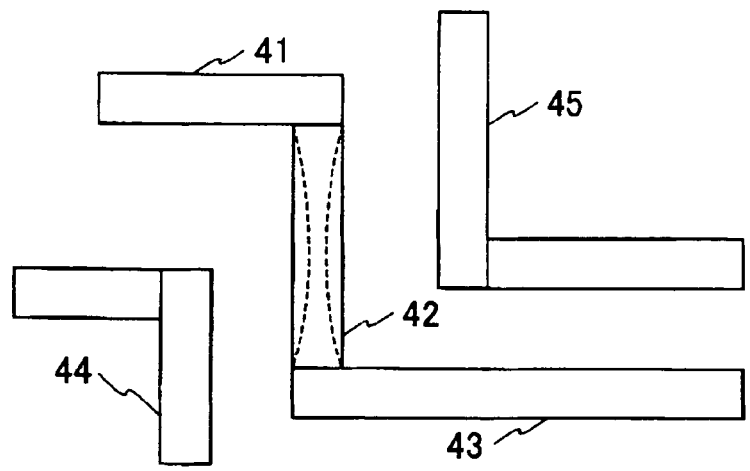
FIG. 7 is a plan view explaining a correcting approach of a wiring pattern in a design supporting system according to the embodiment.
Figure 8:
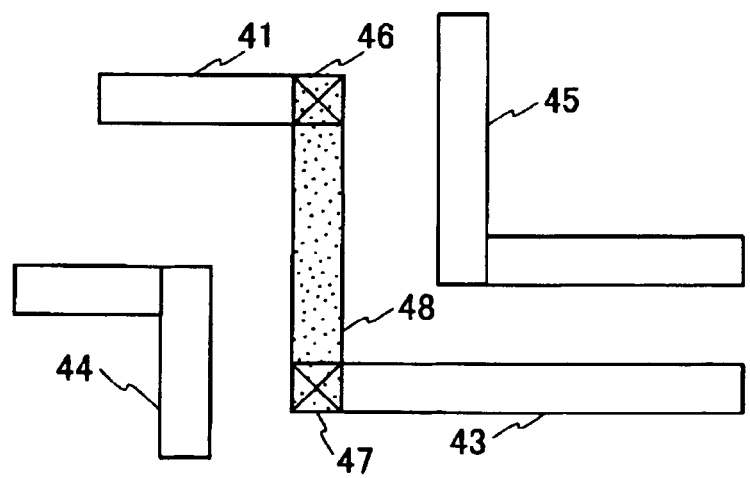
FIG. 8 is a plan view explaining another correcting approach of the wiring pattern in the design supporting system according to the embodiment.
Figure 9:
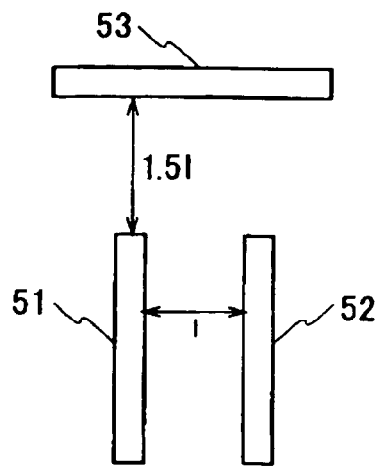
FIG. 9 is a view explaining a wiring space relaxation rule of the wiring pattern in the design supporting system according to the embodiment.

The layout correcting unit 15 selects the area 48 where the occurring frequency of the defective pattern exceeds the predetermined value, based on the decision result of the manufacturability verifying unit 25 and then corrects the area. For example, as shown in FIG. 7, in case wiring patterns 41, 42, 43, 44, 45 are placed adjacently on the layout, the wiring pattern 42 located between the wiring pattern 41 and the wiring pattern 45 is liable to be formed narrower than a specified dimension (see dotted lines in FIG. 7). Therefore, as shown in FIG. 8, the layout correcting unit 15 forms a wiring pattern 48 by replacing the wiring pattern 42 in FIG. 7 with an upper layer or a lower layer of the wiring pattern 42 in other area, and then connects the wiring pattern 48 and the wiring patterns 41, 43 via vias 46, 47. Also, as shown in FIG. 9, the layout correcting unit 15 corrects a space I between ends of wiring patterns 51, 52 extending in the vertical direction and a wiring 53 extending in the horizontal direction, for example, based on the information of the wiring relaxation rule stored in the data storing equipment 3 such that the space I is increased 1.5 times longer than a space between the wiring patterns 51, 52.

There are areas where the wiring patterns as shown in FIGS. 15A, 15B, 15C, and 15D are included as other examples of the defective pattern over the predetermined value. In FIGS. 15A, 15B, 15C and 15D, a tip end of other wiring pattern or a corner of other wiring pattern is disposed around a tip end of the wiring pattern. The layout correcting unit 15 changes wiring paths so that the tip end of other wiring pattern or the corner of other wiring pattern is not disposed around the tip end of the wiring pattern, and corrects a design of the wiring pattern based on the decision result of the manufacturability verifying unit 25. As a result of the correction, a design of the wiring pattern as shown in FIGS. 16A, 16B, 16C, and 16D can be obtained. Accordingly, a cause for declining a process yield is decreased.

The data storing equipment 3 in FIG. 1 has a cell connection storing device 31, a layout correcting rule storing device 32, a cell library storing device 33, a manufacturability evaluation index storing device 34, an analyzed result storing device 35, and a layout result storing device 36. Design constraint information about the net list, the timing constraint, and the arrangement, etc. are stored in the cell connection storing device 31. Various information used to correct placements of cells, wirings, and vias are stored in the layout correcting rule storing device 32. Shape information about logic cells, macrocells, input/output cells, etc. are stored in the cell library storing device 33. Information of the defective patterns offered by the fault information collecting interface 8 from the terminals 100, 101, ..., in respective factories via the computer network 9, layout evaluation index information used to evaluate the manufacturability, and the like are stored in the manufacturability evaluation index storing device 34. The analyzed result storing device 35 stores various analyzed results analyzed by the manufacturability analyzing unit 20. The layout result storing device 36 stores the layout results that the layout designing unit 10 decided, and the like.

In FIG. 1, the program storing device 2 stores input/output data, layout parameters and their histories, data generated in the course of the calculation, and the like. The input device 5 contains keyboard, mouse, light pen, flexible disk drive, and the like. The operator can designate the input/output data or can set numerical values in the automatic design, and the like by the input device 5. Also, the operator can set layout parameters of output data mode, etc. or can input the instruction for execution, stop, or the like of the calculation via the input device 5. The display device 6 and the output device 7 contain the display, the printer unit, and the like respectively.

Next, a method of designing the semiconductor integrated circuit using the design supporting system shown in FIG. 1 will be explained with reference to a flowchart shown in FIG. 10 hereunder.

(a) In step S1, the information of the defective patterns regarding the shape information, etc., which are sent out from the terminals 100, 101, ..., in the first factory, the second factory, ..., in FIG. 1 and are hard to apply the lithography process, are gathered into the fault information collecting interface 8 via the computer network 9 such as the Internet, or the like. The information of the defective patterns gathered by the fault information collecting interface 8 are stored in the manufacturability evaluation index storing device 34 of the data storing equipment 3. Various information in layout, verification, and correction of the semiconductor integrated circuit, programs, and the like are stored in the cell connection storing device 31, the layout correcting rule storing device 32, the cell library storing device 33, and the program storing device 2 via the input/output control portion 4 in FIG. 1.

(b) In step S2, the floor planning is executed. More particularly, the floor plan unit 11 reads the information such as net list, timing constrain, chip shape of the manufactured semiconductor integrated circuit, position information of the input/output terminal, design constraint information about cell shapes and placements, the layout manufacturability evaluation index, and the like stored in the data storing equipment 3, and then decides the floor plan of the overall chip surface. The information of the floor plan are stored in the layout result storing device 36. Also, the dividing unit 12 divides virtually the inside of the chip into a plurality of areas like the lattice. The information of divided areas are stored in the layout result storing device 36. In step S3, the placing unit 13 reads the information of the floor plan stored in the layout result storing device 36, and then places logic cells, macrocells, input/output cells, and the like in a plurality of areas divided by the dividing unit 12. The cell placement information are stored in the layout result storing device 36.

(c) In step S4, the routing unit 14 reads the cell placement information from the layout result storing device 36. The routing unit 14 executes the global routing based on the cell placement information. The executed result of the global routing is stored in the layout result storing device 36. In step S5, the routing unit 14 reads the executed result of the global routing from the layout result storing device 36. Then, the routing unit 14 executes the detailed routing based on the executed result of the global routing. The executed result of the detailed routing is stored in the layout result storing device 36.

(d) In step S6, various analyses are applied to the layout result of the overall surface of the chip designed in above steps S3 to S5. More particularly, in step S61, the layout trimming unit 21 converts the information of the layout result stored in the layout result storing device 36 and the information of the defective patterns stored in the manufacturability evaluation index storing device 34 into the topology information of the skeletons (frames). The converted result is stored in the analyzed result storing device 35. The OPC selecting unit 22 selects types of the OPC pattern shapes, positions of the processed object, etc., then executes the OPC process, and then senses the problem locations in the OPC process. The executed result of the OPC process and the sensed result of the problem locations in the OPC process are stored in the analyzed result storing device 35. The critical area sensing unit 23 senses the areas, in which short, open, shortening, etc. of the wirings or the vias occur, in the layout data as the defective pattern and then causes the analyzed result storing device 35 to store the sensed result therein. The pattern comparing unit 24 compares the layout result stored in the layout result storing device 36 with the topology of the corresponding information of the layout result storing device 36, and senses the defective patterns in the layout result. The sensed result is stored in the analyzed result storing device 35.

(e) In step S62, the manufacturability verifying unit 25 calculates (analyzes) the occurring frequencies of the defective patterns that the OPC selecting unit 22, the critical area sensing unit 23, and the pattern comparing unit 24 sense respectively, and then causes the analyzed result storing device 35 to store the analyzed result therein. The manufacturability verifying unit 25 reads the existing values stored in the manufacturability evaluation index storing device 34, and decides respectively whether or not the analyzed results of the occurring frequency of the defective patterns in respective areas exceed the predetermined value. The decided results are stored in the analyzed result storing device 35.

(f) In step S7, the layout correcting unit 15 reads the decides results of each area stored in the analyzed result storing device 35 respectively, then extracts selectively the placements of the patterns in the area where the occurring frequency of the defective patterns exceeds the predetermined value, and then corrects placement positions of cells, wirings, and vias, shapes, etc. in the area to reduce the occurring frequency of the defective pattern smaller than the predetermined value. The corrected results of the layout are stored in the layout result storing device 36.

According to the design method of the semiconductor integrated circuit according to the present embodiment, the information of the defective patterns such as defects in the lithography process, and the like generated in the factory are stored in the data storing equipment 3 via the computer network 9. The information of the defective patterns can always be transmitted from the terminals 100, 101, ..., in respective factories via the computer network 9. Therefore, for example, when the defective patterns that are hard to apply the lithography process are generated in respective factories, the shape information of the defective patterns are stored in the data storing equipment 3. Then, when the design supporting system in FIG. 1 executes the layout design, such system corrects in advance the positions of cells, wirings, and vias based on the information of the defective patterns stored in the data storing equipment 3 such that the occurring frequencies of the corresponding defective patterns in the layout are made lower than the predetermined value. Since the information of the defective patterns can be always offered via the computer network 9, the layout design can be executed in consideration of the manufacturability of the semiconductor integrated circuit during the manufacturing step. As a result, the defects such as disconnection, short, etc. are difficult to occur and thus yield of the semiconductor integrated circuit can be improved. Also, since the information of the defective patterns are extracted from the terminals 100, 101, . . . , in a plurality of factories via the fault information collecting interface 8, the layout can be designed while taking respective process fluctuations and variations in a plurality of factories into account and thus variations of the yield among a plurality of factories can be suppressed.

Figure 10:
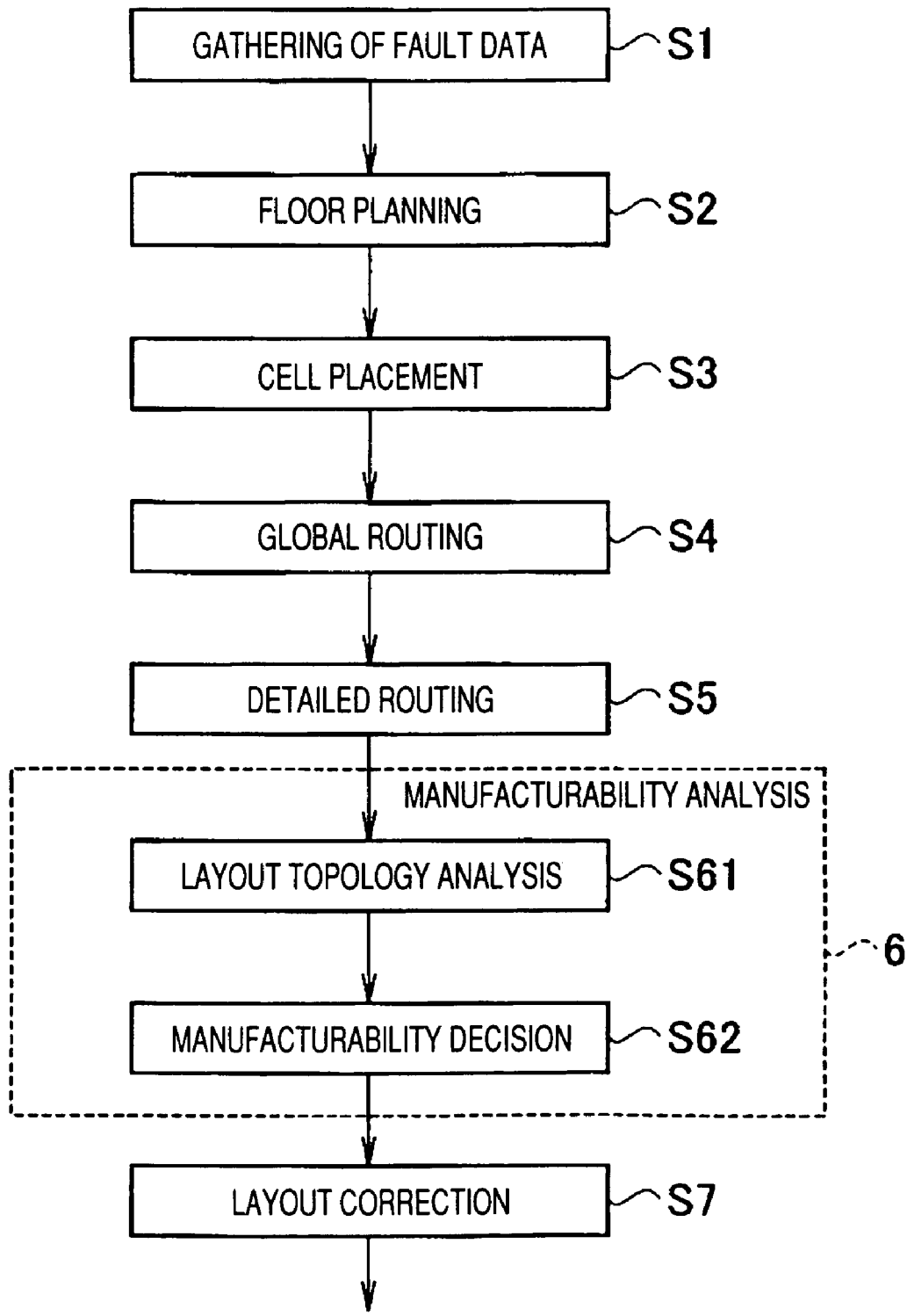
FIG. 10 is a flowchart showing an example of a method of designing the semiconductor integrated circuit according to the embodiment.

A series of design processes, a flow of which is shown in FIG. 10, can be executed by controlling the design supporting system shown in FIG. 1 in compliance with the program having the algorithm equivalent to FIG. 10. This program may be stored in the program storing device 2 shown in FIG. 1.

More particularly, the design supporting program according to the embodiment contains (a) procedure in which the data storing equipment 3 stores information of the defective pattern that is gathered via the computer network 9 and is hard to apply the lithography process, (b) procedure in which the layout designing unit 10 defines a plurality of areas in the chip and decides a layout of the chip by automatically placing/routing cells, wirings, and vias every area, (c) procedure in which the manufacturability analyzing unit 20 reads information of the defective pattern, collates the information with a decided result of the layout, calculates an occurring frequency of the defective pattern every area, and analyzes the manufacturability of the layout based on the occurring frequency, and (d) procedure in which the layout correcting unit 15 extracts selectively the area where the occurring frequency is in excess of a predetermined value, and corrects placements of the cells, the wirings, and the vias in the area.

When the automatic design program according to the first embodiment is saved in a computer-readable recording medium and then this recording medium is read by the program storing device 2, a series of automatic designing processes in the automatic design according to the first embodiment can also be executed. The "computer-readable recording medium" unit a medium that can record the program, for example, external memory device of the computer, semiconductor memory, magnetic disk, optical disk, magneto-optical disk, magnetic tape, and the like. Concretely flexible disk, CD-ROM, MO disk, and the like are contained in the "computer-readable recording medium". For example, a main body of the computer system can be constructed to have a built-in or external flexible disk drive and a built-in or external optical disk drive. The program stored in the recording medium can be installed into the program storing device 2 constituting the computer system by inserting the flexible disk into the flexible disk drive or inserting the CD-ROM into the optical disk drive and then executing a predetermined reading operation. Also, the ROM, the magnetic tape unit, or the like as the memory device utilized in the game pack, or the like, for example, can be employed by connecting a predetermined drive unit. In addition, this program can be stored in the program storing device 2 via the computer network 9 such as the Internet, or the like.

Figure 11:
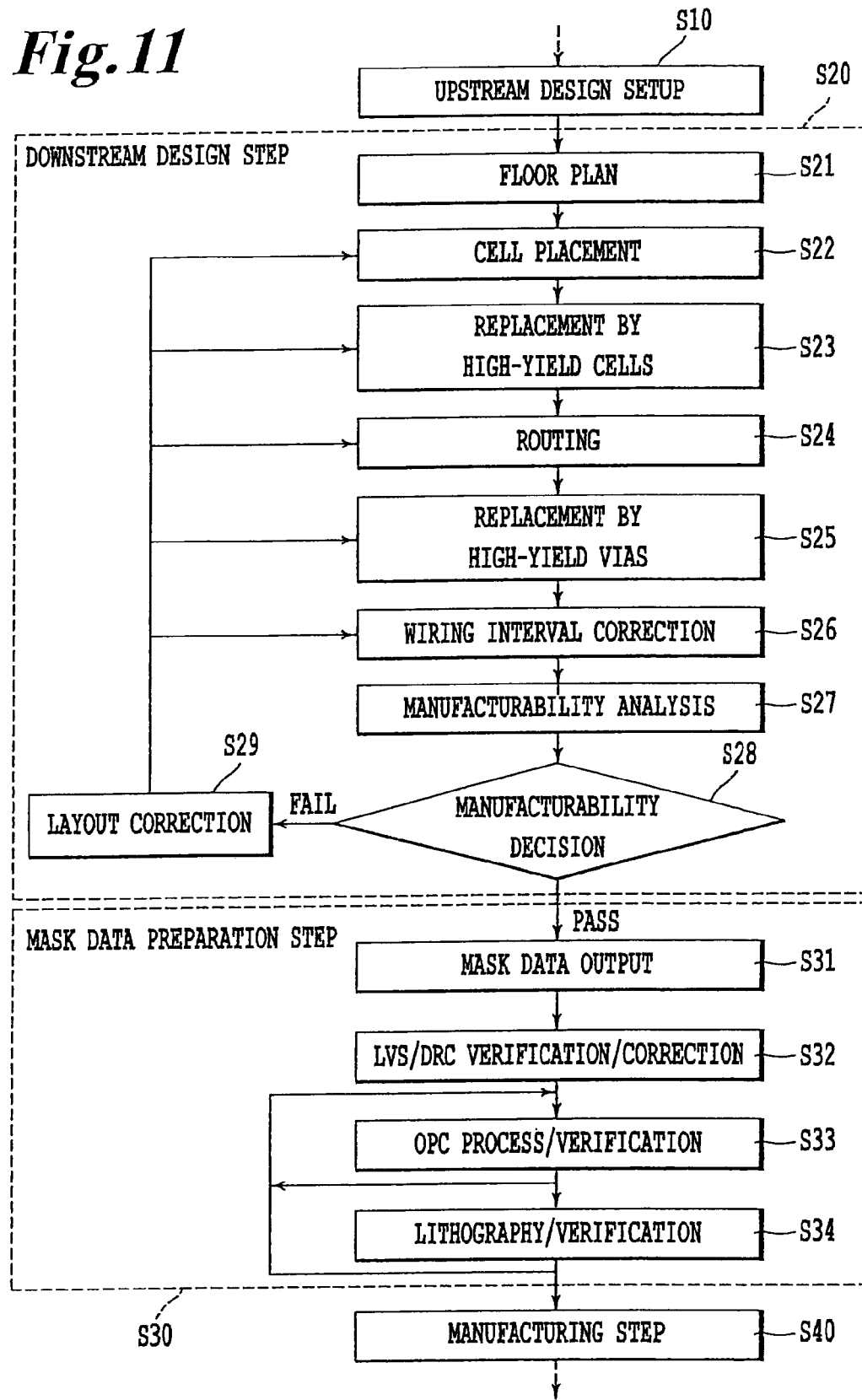
FIG. 11 is a flowchart showing a method of manufacturing the semiconductor integrated circuit according to the embodiment.

Next, an example of a method of manufacturing the semiconductor integrated circuit using the design supporting system shown in FIG. 1 will be explained with reference to a flowchart shown in FIG. 11 hereunder.

(a) In step S10, the information such as RTL design, logic synthesis, net list, and the like, which are in the layout design of the semiconductor integrated circuit, are collected (upstream design step). The information collected in step S10 are stored in the data storing equipment 3 via the input device 5 or the computer network 9.

(b) In step S20, the layout design of the semiconductor integrated circuit is carried out (downstream design step). More particularly, in step S21, the floor plan unit 11 in FIG. 1 formulates the floor plan of the semiconductor integrated circuit by reading the information such as net list, timing constrain, chip shape, position information of the input/output terminal, the design constraint information regarding cell shape and placement of the manufactured semiconductor integrated circuit, the layout manufacturability evaluation index, and the like stored in the data storing equipment 3 from the data storing equipment 3. The formulated result of the floor plan is stored in the layout result storing device 36.

(c) In step S22, the dividing unit 12 in FIG. 1 divides virtually a semiconductor integrated circuit forming area into a plurality of areas like the lattice. The placing unit 13 reads the information of the floor plan stored in the layout result storing device 36, and then places logic cells, macrocells, input/output cells, and the like on the semiconductor integrated circuit forming area. In step S23, the layout correcting unit 15 replaces logic cells, macrocells, input/output cells, and the like placed by the placing unit 13 with high-yield cells, based on the information of the manufacturability evaluation index, and the like. The replaced result is stored in the layout result storing device 36.

(d) In step S24, the routing unit 14 reads cell placement information from the layout result storing device 36. The routing unit 14 provides the wirings among a plurality of cells based on the cell placement information, and connects the wirings via vias. The routed result is stored in the layout result storing device 36. In step S25, the routing unit 14 reads the routed result stored in the layout result storing device 36, and replaces the vias used to connect the wirings with high-yield vias such as a plurality of vias (multiplexed vias), or the like. The replaced result of the high-yield vias is stored in the layout result storing device 36. In step S26, the routing unit 14 reads the routed result stored in the layout result storing device 36, and corrects wiring intervals.

(e) In step S27, the manufacturability analyzing unit 20 in FIG. 1 reads the information of the defective patterns stored in the manufacturability evaluation index storing device 34 by referring to the executed result of the layout stored in the layout result storing device 36, and then calculates the occurring frequency of the defective pattern every area. In step S28, the manufacturability verifying unit 25 decides whether or not the occurring frequency exceeds the predetermined value. If the occurring frequency exceeds the predetermined value, the process goes to step S29. In step S29, the layout correcting unit 15 corrects the placements of the cells, the wirings, and the vias shown in steps S22 to S26 based on the analyzed result of the manufacturability. The corrected result is stored in the layout result storing device 36.

(f) In step S31, the layout data stored in the layout result storing device 36 are displayed on the display device 6. In step S32, the physical verification and correction of respective patterns in the resultant layout are executed by reading the software such as DRC, LVS, and the like in response to the layout data displayed on the display device 6. In step S33, the OPC process and verification are executed by reading an OPC software in response to the layout data displayed on the display device 6. In step S34, the lithography verification is applied to the layout data displayed on the display device 6. Thus, the preparation of mask data is completed.

(g) In step S40, plural sets of masks (reticles) required for the substrate step, the wiring step, etc. respectively are manufactured by the pattern generator such as the electronic beam exposure system, or the like on a predetermined alignment margin, based on the resultant mask data.

(h) Then, in the substrate step, first a plurality of chip patterns are aligned periodically on the semiconductor wafer by the sequential reduction exposure system (stepper) while using respective reticles in respective steps (manufacturing process), and then fine patterns are formed. In other words, for example, a silicon oxide film is deposited on the silicon substrate and then a photoresist film is coated on the silicon oxide film. Then, the photoresist film is patterned by executing the photolithography step using a sheet of reticle among the set of manufactured reticles for the substrate step. Then, the silicon oxide film is etched selectively while using the patterned photoresist film as a mask. Then, the p-type or n-type impurity ion, for example, is implanted selectively into a surface of the silicon substrate while using the photoresist film and the silicon oxide film as a mask. Then, the photoresist used as the mask in the ion implantation is removed. Then, various steps are applied sequentially to the reticles in the rectile sets. For example, impurity diffusion regions are formed in the silicon substrate by activating the implanted ions to drive in (diffuse) these ions up to a desired depth, and the like. Thus, the transistors, etc. of respective cells are formed.

(i) Then, desired patterns are drawn on the substrate surface by the stepper using the reticles required for respective steps in the surface wiring step, and thus the routing process is applied to the substrate surface. In other words, the wirings are formed on the silicon substrate, for example, by the CVD method, the PVD method, or the like while using a sheet of reticle among the reticle set in the surface wiring step, and then the surface is made flat by the chemical-mechanical polishing (CMP) method. An etching mask is formed by coating a photoresist on an interlayer insulating film and then patterning the photoresist film by unit of the photolithography step. Vias are formed in the interlayer insulating film by applying the reactive ion etching (RIE), or the like while using the etching mask. The photoresist is removed, the surface is cleaned, and a metal is deposited in the vias. A new etching mask is formed by applying the photolithography step again, and then the metal film is patterned. In this manner, a series of steps are repeated by using the reticle in the set of reticles sequentially. Thus, a multi-layered wiring structure is formed.

(j) After the surface wiring step is completed, the wafer is divided into the chips in a predetermined chip size by the dicing device such as a diamond blade, or the like (dicing step). Then, the chip is mounted on the packaging material (mounting step), and electrode pads on the chip and leads of the lead frame are connected via gold wires or bumps (bonding step). Then, predetermined package assembling step such as the resin sealing, or the like is executed (sealing step). Then, predetermined tests such as characteristic test regarding performances/functions of the semiconductor device, test for shape/dimension states of the lead, reliability test, and the like are executed (testing step). Thus, the semiconductor device is completed. The semiconductor device gone through above all steps is packaged and protected from moisture, static electricity, and the like, and then forwarded as the product.

According to the method of manufacturing the semiconductor integrated circuit according to the present embodiment, in the downstream design step in step S20, the layout of the cells, the wirings, or the vias in the area where the occurring frequency of the defective patterns is high is corrected in advance based on the information of the defective patterns, which are collected from the terminals 100, 101, . . . , in respective factories via the computer network 9, to reduce the occurring frequency of the defective patterns. Therefore, a processing time required for the mask data preparation step in step S30 can be reduced extremely. In addition, since the number of layouts as the defective pattern is reduced beforehand in the downstream design step in step S20, generation of the defective patterns that cannot be overcome by the pattern correction in the mask data preparation step in step S30 can be reduced. As a result, the semiconductor integrated circuit can be manufactured by using the mask that can generate few occurring frequencies of the defective pattern, and also the yield in the manufacturing step can be improved.

(Variation)

A method of designing a semiconductor integrated circuit according to a variation of the present embodiment will be explained with reference to a flowchart shown in FIG. 12 hereunder. Here, a method of designing a semiconductor integrated circuit in the wiring interval correcting step shown in step S26 in FIG. 11 will be explained by way of example.

Figure 12:
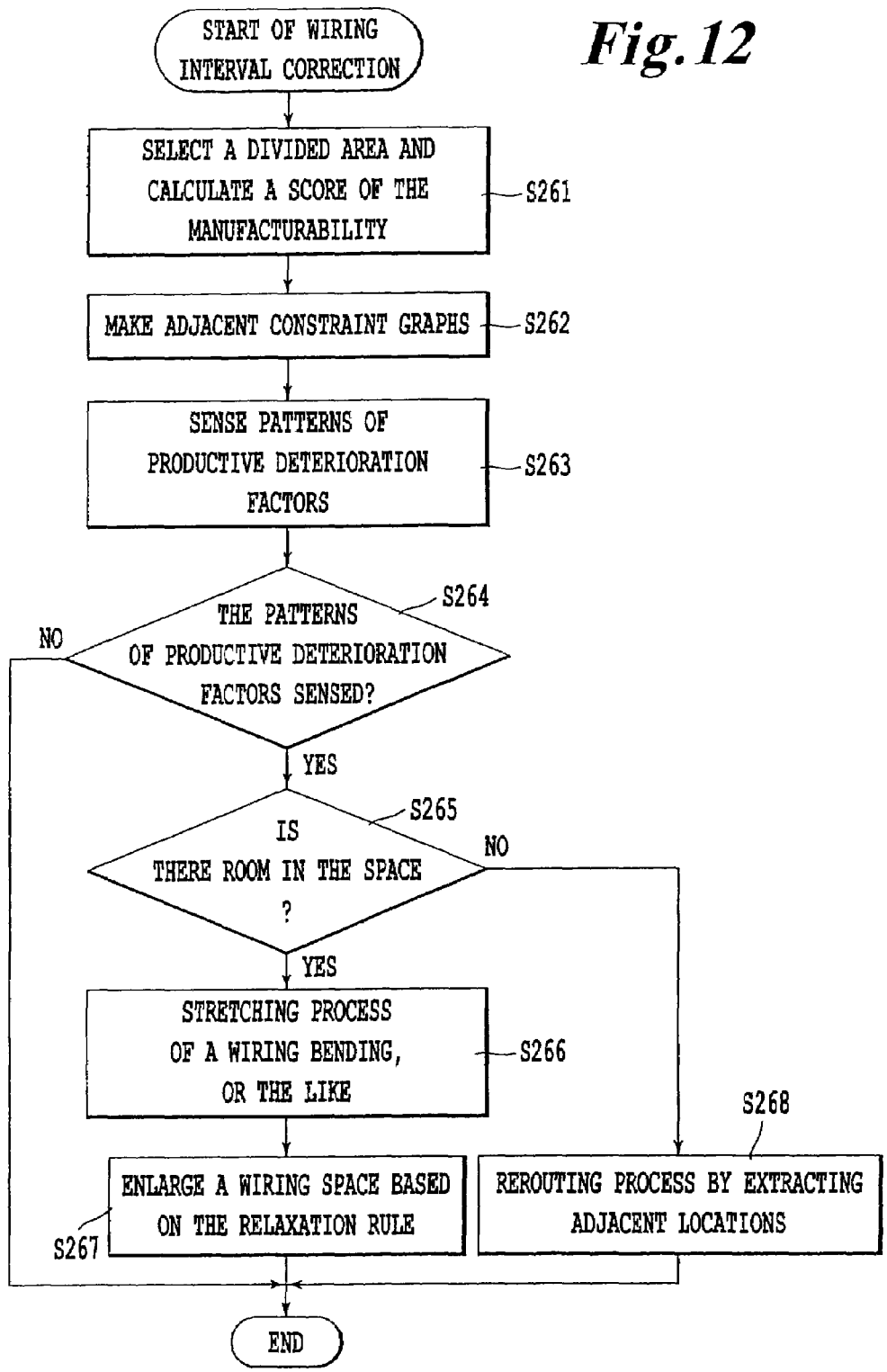
FIG. 12 is a flowchart showing a method of manufacturing a semiconductor integrated circuit according to a variation of the embodiment.

(a) In step S261 in FIG. 12, the manufacturability verifying unit 25 in FIG. 1 reads the information of the decided result of the layout that the layout designing unit 10 decided from the layout result storing device 36, and selects one area divided by the dividing unit 12. The manufacturability verifying unit 25 reads the information of the defective patterns such as wiring shorts, etc. of the semiconductor integrated circuit, which are sensed by the OPC selecting unit 22, the critical area sensing unit 23, and the like, from the analyzed result storing device 35, then calculates the occurring frequency of the defective patterns in the divided area by collating such information with the decided result of the layout, and then calculates an evaluation value of the manufacturability in the divided area. The manufacturability verifying unit 25 sets neighboring areas required for the correction.

(b) In step S262, the layout trimming unit 21 defines virtual terminal positions by using intersection points between boundaries of the set areas and the wirings as virtual terminals, and then makes adjacent constraint graphs of polygonal closed figures such as the wirings, etc. representing relationships of lengths, widths, shapes, connectivity list, etc, of neighboring figures. Then, in step S263, the pattern comparing unit 24 collates the topology information of the defective patterns that cause the productive deterioration factors registered previously in the manufacturability evaluation index storing device 34 with the adjacent constraint graphs, and then decides whether or not the defective patterns acting as productive deterioration factors in the lithography, or the like are present (step S264).

(c) In step S265, if the defective patterns acting as productive deterioration factor are present, the layout correcting unit 15 reads the information of the area where the defective pattern exists and other neighboring areas, and then decides whether or not there is room in the space to correct the defective pattern, based on the wiring relaxation rule stored in the data storing equipment 3. In step S266, if there is room in the space, the layout correcting unit 15 relaxes an excessive bending of the wiring in the defective pattern that exists in the divided area, based on the information of the wiring bending relaxation rule stored in the data storing equipment 3.

(d) In step S267, the layout correcting unit 15 enlarges a wiring space of the defective pattern acting as the productive deterioration factor, based on the space relaxation rule stored in the data storing equipment 3. In step S268, if there is no space to correct the defective pattern, the layout correcting unit 15 applies the rerouting process to other neighboring area, e.g., other area in the upper layer or the lower layer in the area where the defective pattern is present. Thus, the layout correcting unit 15 calculates the routing complexity in the virtual terminal positions on the defined boundaries and the portion surrounded by the boundaries of the divided areas while estimating in detail the internal cell terminal positions, and the like, and executes the optimization of the wirings in the area.

The layout of the overall surface of the chip can be completed by applying repeatedly a series of processes shown in steps S261 to S268 to the neighboring areas of the defective pattern locations where latent short, open, or shortening due to the process fluctuation is generated. According to the method of designing the semiconductor device according to the variation of the present embodiment, the patterns serving as the productive deterioration factor in the area are corrected/eliminated in a state that the set virtual terminals and the layout pattern information on the outside of the divided area are held. When the overall surface of the chip should be optimized, the simulated annealing approach, or the like may be installed into the process that repeats the process in the problem candidate location.

Other Embodiments

As described above, the present invention is set forth based on the embodiments, but it should not be understood that the discussion and the drawing constituting a part of this disclosure limit this invention. Various alternative embodiments, examples, and application technologies become apparent for those skilled in the art from this disclosure.

Figure 13:
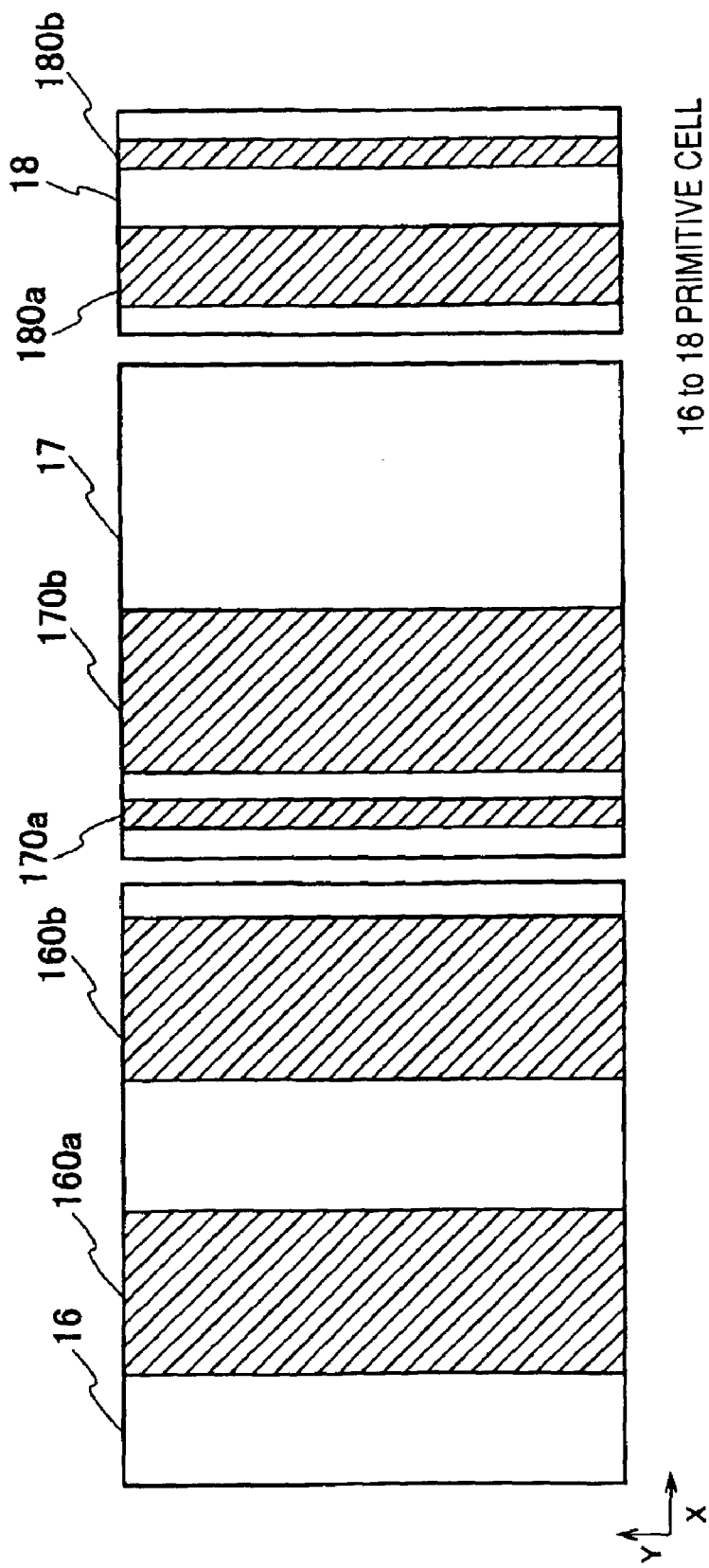
FIG. 13 is a plan view showing a method of designing the semiconductor integrated circuit according to another embodiment.
Figure 14:
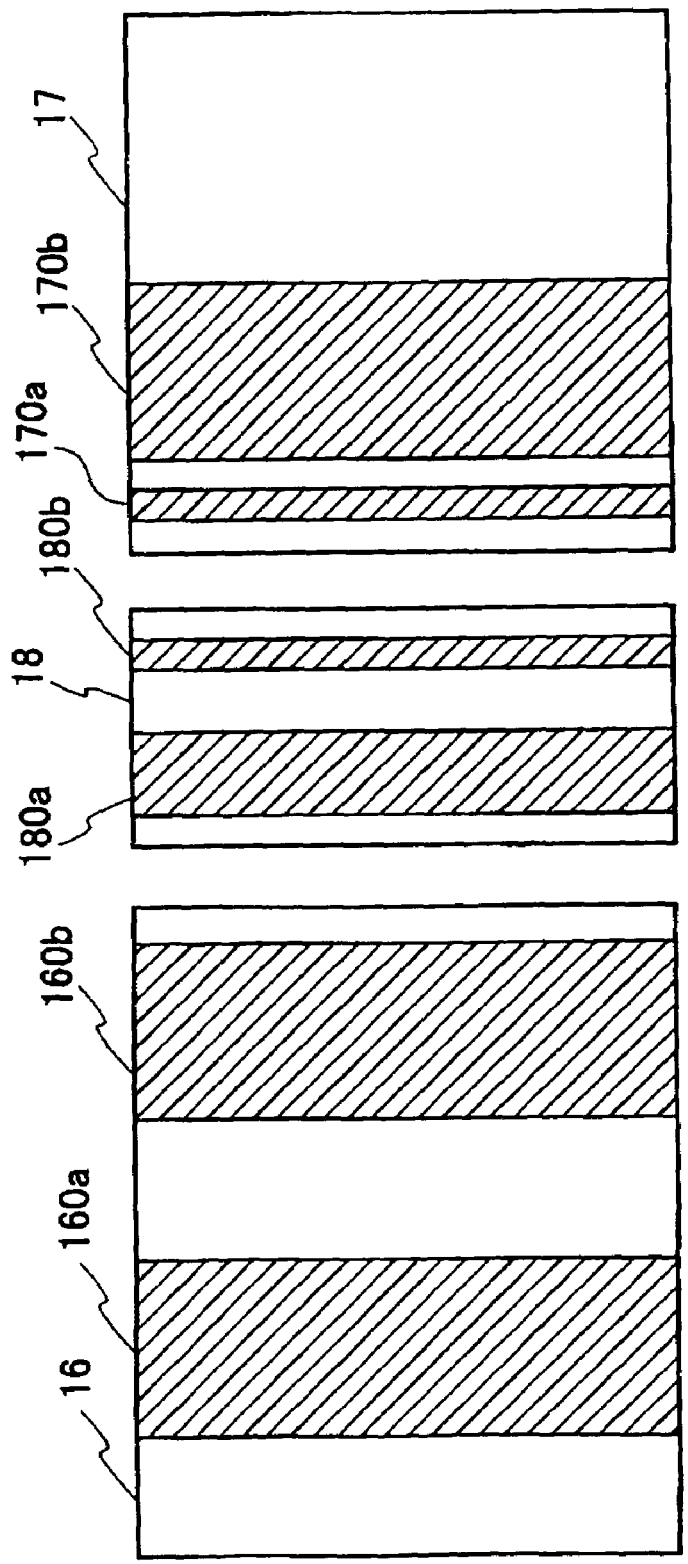
FIG. 14 is a plan view showing a method of designing the semiconductor integrated circuit according to another embodiment.
Figure 15A:
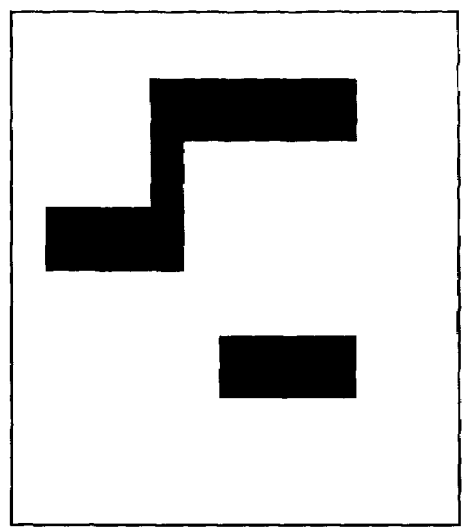
FIGS. 15A, 15B, 15C and 15D are plan views explaining another correcting approach of the wiring pattern in the design supporting system according to the embodiment.
Figure 15B:
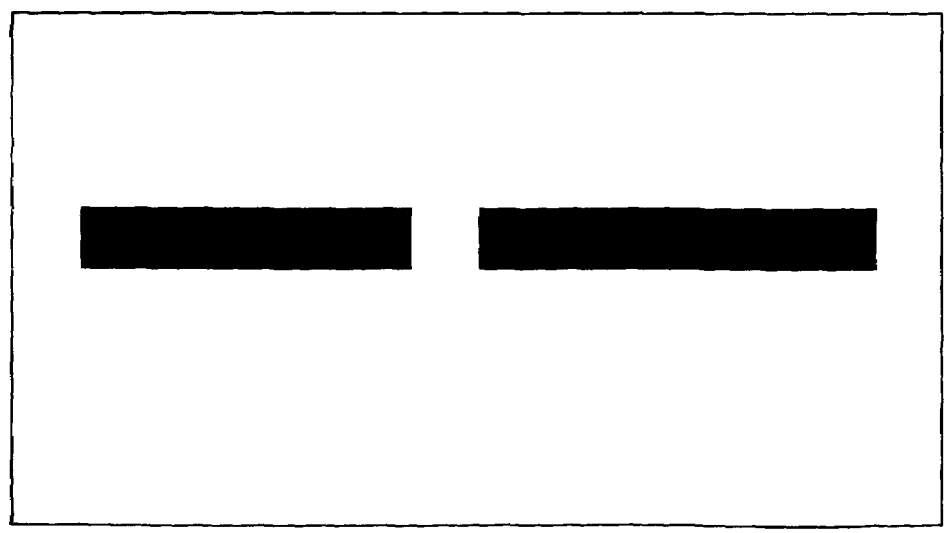
Figure 15C:
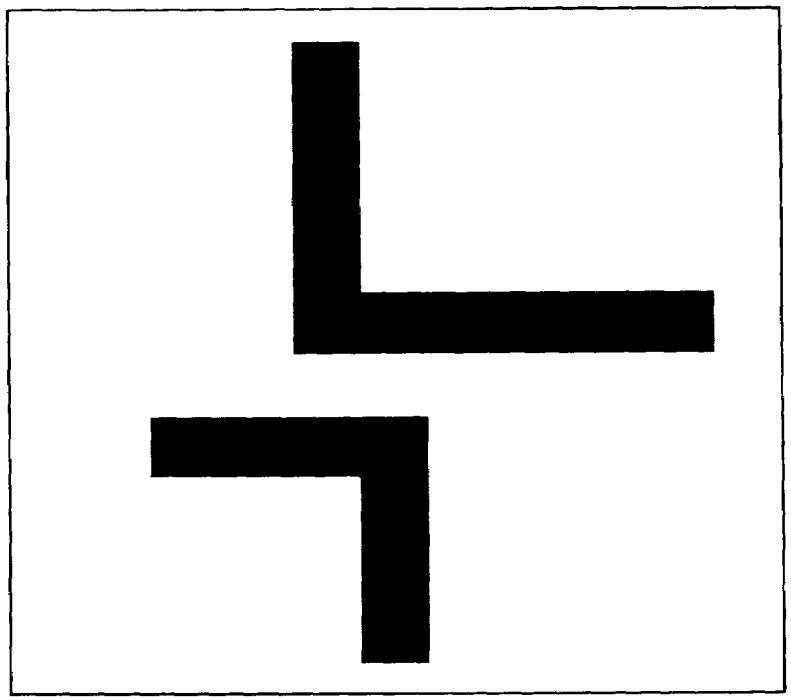
Figure 15D:
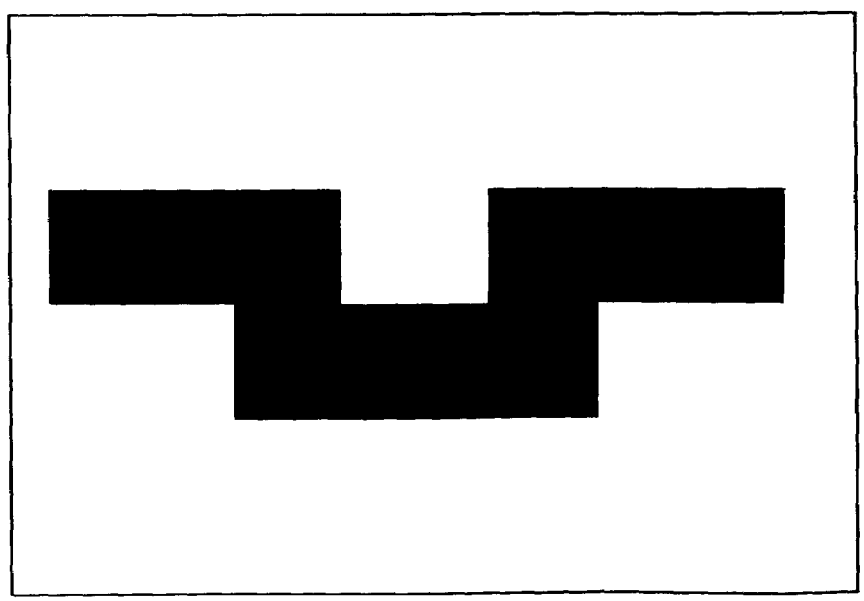
Figure 16A:
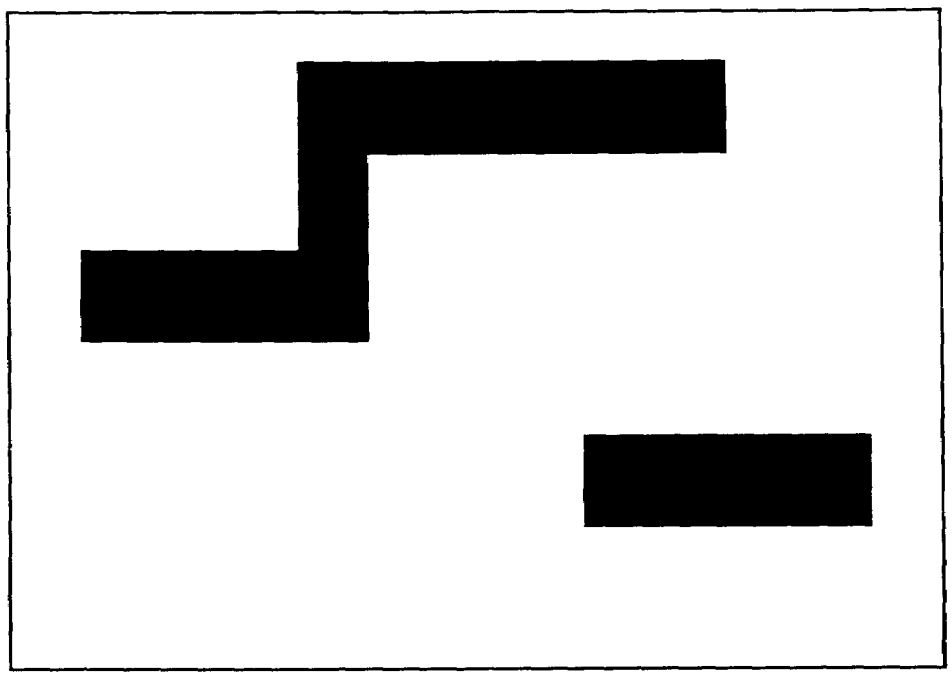
FIGS. 16A, 16B, 16C and 16D are plan views explaining another correcting approach of the wiring pattern in the design supporting system according to the embodiment.
Figure 16B:
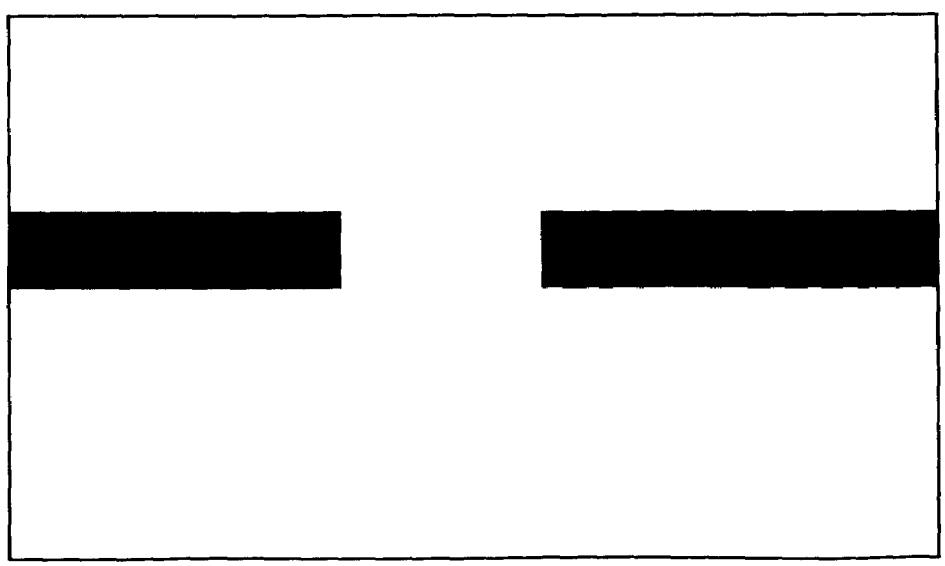
Figure 16C:
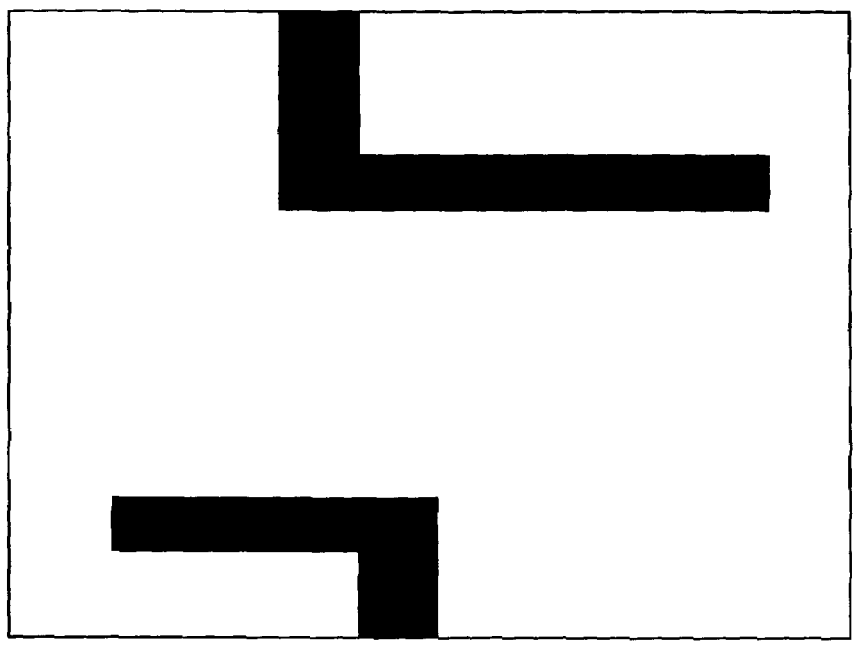
Figure 16D:
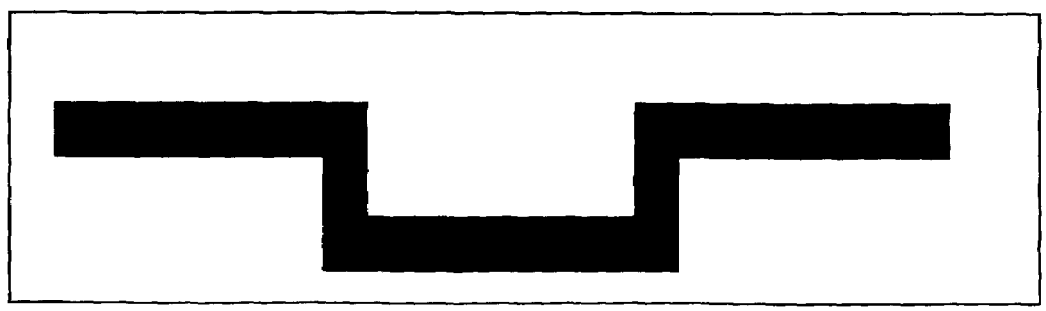

FIG. 13 and FIG. 14 is an example of the pattern layout showing an arrangement in the case where the optimization of cell placement is automatically corrected by utilizing the design supporting system according to the present embodiment respectively. Rectangular primitive cell 16, 17, 18 are placed adjacently on the chip respectively. Wiring patterns 160*a*, 160*b* are formed on the primitive cell 16. Wiring patterns 170*a*, 170*b* are formed on the primitive cell 17. Wiring patterns 180*a*, 180*b* are formed on the primitive cell 18. In FIG. 13, the wiring pattern 170*a* that is narrow in the X direction is put between the thick wiring patterns 160*b*, 170*b*. Therefore, these figures show that the wiring pattern 170*a* that is narrow in the X direction constitutes the defective pattern that causes the defect such as open, short, shortening, or the like, and thus this cell placement situation will cause the defect in the manufacturing step.

In the design supporting system according to the present embodiment, the information of widths, shapes, etc. of the wiring patterns 160*a* to 180*b* are stored in the layout result storing device 36 as the characteristics of the primitive cells 16 to 18. Then, the manufacturability analyzing unit 20 extracts the information of the defective pattern (wiring pattern 170*a*) acting as a cause to deteriorate the yield by referring to the characteristics of the primitive cells 16 to 18, and senses that the above pattern adjacent situation is generated by such cell placement position to bring about the defective failure. The layout correcting unit 15 executes replacement, position exchange, and movement of the primitive cells 16 to 18 to improve such situation. Accordingly, as shown in FIG. 14, since the wiring patterns 170*a*, 180*a* that are narrow in the X direction are placed adjacently, the defect such as short, open, or the like generated due to the process fluctuation in the manufacturing can be avoided and thus the yield in the manufacturing can be improved.

In this manner, it is a matter of course that the present invention contains various embodiments not set forth herein. Therefore, the technical scope of the present invention should be defined only by the specific matters of the invention according to the claims adequate from the above explanation.

According to the above-embodiments, the design supporting system of the semiconductor integrated circuit, the method of designing the semiconductor integrated circuit, the design supporting program of the semiconductor integrated circuit, and the method of manufacturing the semiconductor integrated circuit, capable of suppressing generation of design patterns that are hard to apply the lithography process and constitute the circuit fault factor, and also achieving an improvement of yield by suppressing variations caused due to the process fluctuation, can be provided.

What is claimed is:

1. A design supporting system of a semiconductor integrated circuit, comprising:
   a unit that converts a defective circuit pattern into computer detectable information when a layout of chip of the semiconductor integrated circuit is determined, and corrects the defective circuit pattern of the layout of the chip based on the computer detectable information;
   a layout designing unit that decides the layout of the chip by defining a plurality of areas in the chip and automatically placing/routing wirings and vias;
   a data storing equipment that stores the computer detectable information of the defective circuit pattern;
   a manufacturability analyzing unit that reads the computer detectable information of the defective circuit pattern, verifies the computer detectable information of the defective circuit pattern and the layout of the chip decided by the layout designing unit, and analyzes a manufacturability of the layout of the chip, wherein
   the computer detectable information of the defective circuit pattern and the layout of the chip decided by the layout designing unit can be verified, and
   the manufacturability analyzing unit analyzes the manufacturability of the layout of the chip based on an occurring frequency of the defective circuit pattern which is calculated in each area of the plurality of areas in the chip.

2. The system according to claim 1, further comprising:
   a layout correcting unit that extracts selectively an area where the occurring frequency exceeds a predetermined value, and corrects a placement of cells, wirings, and vias in the area.

3. The system according to claim 1, wherein the computer detectable information of the defective circuit pattern is hard to apply lithography process.

4. The system according to claim 1, wherein the computer detectable information of the defective circuit pattern is gathered via a computer network.

5. The system according to claim 1, wherein the defective circuit pattern causes a decline of yield.

6. A method of manufacturing a semiconductor integrated circuit, comprising:
   converting, with a converting device of a design supporting system, a defective circuit pattern into computer detectable information when a layout of a chip of the semiconductor integrated circuit is determined; and
   correcting the defective circuit pattern of the layout of the chip based on the computer detectable information deciding the layout of the chip by defining a plurality of areas in the chip and automatically placing/routing wirings and vias;

storing the computer detectable information of the defective circuit pattern;

reading the computer detectable information of the defective circuit pattern;

verifying the computer detectable information of the defective circuit pattern and the decided layout of the chip; and analyzing a manufacturability of the layout of the chip based on an occurring frequency of the defective circuit pattern which is calculated in each area of the plurality of areas in the chip.

7. The method according to claim 6, further comprising:

extracting selectively an area where the occurring frequency exceeds a predetermined value; and correcting a placement of cells, the wirings, and the vias in the area.

8. The method according to claim 6, wherein the computer detectable information of the defective circuit pattern is hard to apply lithography process.

9. The method according to claim 6, wherein the defective circuit pattern causes a decline of yield.

10. A computer-readable storage medium storing a program of instructions, which, when executed by a processor of a computer, perform a method for supporting a design of a semiconductor integrated circuit, the method comprising:

storing in a data storing equipment information of a defective circuit pattern that is hard to apply a lithography process;

defining a plurality of areas in a chip of the design of the semiconductor integrated circuit;

deciding a layout of the chip by automatically placing/routing cells, wirings, and vias in every area;

reading the information of the defective circuit pattern;

verifying the information of the defective circuit pattern and a result of the decided layout of the chip;

calculating an occuring frequency of the defective circuit pattern in each area of the plurality of areas;

analyzing a manufacturability of the layout based on the calculated occuring frequency; and extracting selectively an area where the calculated occuring frequency of the defective circuit pattern is in excess of a predetermined value; and correcting a placement of cells, wirings, and vias in the area.

11. The storage medium according to claim 10, comprising:

replacing the wirings in the area where tha calculated occuring frequency of the defective circuit pattern is in excess of the predetermined value with a wiring layer in an upper layer or a lower layer of the wirings, based on an analyzed result of the manufacturability when the placement of the cells, the wirings, and the vias in the area is corrected.

12. The storage medium according to claim 10, comprising:

moving a cell or exchanging one cell with another cell based on the analyzed result of the manufacturability when the placement of the cells, the wirings, and the vias in the area is corrected.

\* \* \* \* \*